(12) United States Patent
Fujii (10) Patent No.: US 6,832,721 B2
(45) Date of Patent: Dec. 21, 2004

(54) AUTHENTICATION SYSTEM USING INFORMATION ON POSITION

(75) Inventor: Satoru Fujii, Tokyo (JP)

(73) Assignee: NEC Corporation, Tokyo (JP)

( * ) Notice: Subject to any disclaimer, the term of this patent is extended or adjusted under 35 U.S.C. 154(b) by 9 days.

(21) Appl. No.: 09/968,881

(22) Filed: Oct. 3, 2001

(65) Prior Publication Data

US 2002/0070273 A1 Jun. 13, 2002

(30) Foreign Application Priority Data

Oct. 4, 2000 (JP) ........................................ 2000-305339

(51) Int. Cl.[7] .............................................. G06K 5/00
(52) U.S. Cl. .................... 235/382; 379/380; 379/382.5; 379/383
(58) Field of Search ................................ 235/382, 379, 235/380, 382.5, 383; 455/405, 406, 410

(56) References Cited

U.S. PATENT DOCUMENTS

| | | | | |
|---|---|---|---|---|
| 5,131,038 A | * | 7/1992 | Puhl et al. ................. | 340/5.61 |
| 5,608,778 A | * | 3/1997 | Partridge, III ............. | 455/411 |
| 5,648,763 A | * | 7/1997 | Long .................... | 340/825.49 |
| 5,668,876 A | * | 9/1997 | Falk et al. .................. | 380/271 |
| 5,708,422 A | | 1/1998 | Blonder et al. | |
| 5,903,830 A | * | 5/1999 | Joao et al. ................. | 455/406 |
| 5,991,749 A | * | 11/1999 | Morrill, Jr. .................. | 705/44 |
| 6,085,090 A | * | 7/2000 | Yee et al. .................... | 455/440 |
| 6,250,557 B1 | * | 6/2001 | Forslund et al. ............ | 235/492 |
| 6,487,540 B1 | * | 11/2002 | Smith et al. .................. | 705/21 |
| 2002/0020741 A1 | | 2/2002 | Sakaguchi | |
| 2002/0108062 A1 | | 8/2002 | Nakajima et al. | |
| 2003/0191949 A1 | | 10/2003 | Odagawa | |

FOREIGN PATENT DOCUMENTS

| | | |
|---|---|---|
| EP | 0848360 A1 | 11/1996 |
| GB | 2367171 | 3/2002 |
| JP | 8-339407 | 12/1996 |
| JP | 9-274697 | 10/1997 |
| JP | 10-56449 | 2/1998 |
| JP | 10-198636 | 7/1998 |
| JP | 11-324442 | 11/1999 |
| JP | 2000-268104 | 9/2000 |
| JP | 2002-55960 A | 2/2002 |
| JP | 2002-99860 A | 4/2002 |
| JP | 2002-101091 A | 4/2002 |
| JP | 2002-149611 A | 5/2002 |
| WO | WO 01/88790 A1 | 11/2001 |

* cited by examiner

*Primary Examiner*—Steven S. Paik
(74) *Attorney, Agent, or Firm*—Foley & Lardner LLP (57) ABSTRACT

An authentication system and method uses information on a position of a card as determined, for example, by detecting a position of a user's cell phone and the position of a card reader determined from card reader identification data. If the card is used in a card reader located near the user's cell phone, and the usual card authorizations are approved, it is determined that the card use is authorized. The position information thus serves as an additional level of security against a lost or stolen card.

15 Claims, 4 Drawing Sheets

FIG.2

AUTHENTICATION SYSTEM USING INFORMATION ON POSITION

FIELD OF THE INVENTION

The invention relates to an authentication system using information on a position, and especially to an individual authentication system using information on a position, an authentication system using information on a position and a card, and a door lock system using information on a position and a personal identification number.

BACKGROUND OF THE INVENTION

The several points at issues mentioned as follows are pointed out on the conventional authentication systems using a card.

A magnetic card can be forged easily.

It is not necessarily safe to judge that a card is used by the true owner of the card only form a signature.

In some cases that the amount of money for settlement of accounts is small, even the signature is unnecessary, and it is enough to pass the card through a card reader. If the card is used in such a way, there is no means for seeing through an unauthorized usage of the card. If inputting of a personal identification number (PIN) of the card is seen by a third person, there arises a possibility that the personal identification number will be leaked, and the safety of the system is not necessarily perfect.

If the number of figures of the personal identification number is increased, although security of the authentication system is heightened, facilities for the user are sharply deteriorated.

If a finger print authentication unit is introduced into the individual authentication system, a new apparatus must be set up, and the system becomes high priced.

In an invention disclosed in Japanese Patent Applications, Laid-Open, No. 10-56449, since information on the position is utilized to strengthen security and an portable instrument itself is authenticated, this invention is not related to the present invention directly. Since the position of the instrument is fixed, this invention is not suited for authenticating the instrument on a vehicle.

SUMMARY OF THE INVENTION

Accordingly, it is an object of the invention to provide an authentication system using information on a position which heightens security of authentication and excludes an unauthorized access of a person other than the subject of authentication on the basis of a comparison between information on a position of an authenticator and that of the subject of authentication. It should be noted that the authentication system using information on the position includes an individual authentication system using information on a position, an authentication system using information on a position and a card, and a door lock system using information on a position and a personal identification number.

According to the first feature of the invention, an individual authentication system using information on a position comprises:

a means for detecting a position of a subject of authentication, and an individual authentication unit, the individual authentication unit being composed of:

a means for detecting a position of the individual authentication unit, a mean for authentication, a means for establishing a method for authentication, a means for judging a position, an unauthorized usage-notification means, a communication means, and a subject of authentication-registering domain, wherein the means for judging the position judges whether the subject of authentication is a legitimate one or not on a basis of a comparison between the position of the individual authentication unit detected by the means for detecting the position of the individual authentication unit and the position of the subject of authentication detected by the means for detecting the position of the subject of authentication, and the judgement is confirmed by the means for authentication.

According to the aforementioned structure, since authentication is confirmed on the basis of a comparison between information on a position of the individual authentication system and that of the subject of authentication (the user), unauthorized access such as impersonation is excluded, and security of authentication can be heightened. It should be noted in the above description that the positions of the individual authentication system and the subject of authentication are detected by the respective position detecting means provided for them.

Since authentication is not restricted because the position of the subject of authentication is not fixed, and confirmed by a comparison between the position of the individual authentication system and that of the person to be authenticated, facilities for the user on a vehicle are not deteriorated, and the system can function anytime and anywhere.

The unauthorized usage-notification means may be a notification means using a voice signal transmitted by a cellular telephone of the user, which notifies him immediately that the card is used at a position remote from him or by a person other than him.

Moreover, the unauthorized usage-notification means may be a notification means using an electronic mail transmitted by the cellular telephone of the user, which notifies him immediately that his card is used at a position remote for him or by a person other than him.

According to the second feature of the invention, an authentication system using information on a position and a card, comprises;

a card reader having its inherent identification information, a ten key for authenticating a user on a basis of his personal identification number, a authentication unit of a card company, a card reader data base, a card user data base, a position-acquiring unit of an enterprise of a cellular telephone, and.

the cellular telephone, wherein the authentication unit of the card company is provided with a means for calculating information on a position of the card reader on a basis of the card reader identification information and the card reader data base storing the card reader identification informations and situations of the card readers, and a means for searching for a telephone number of the cellular telephone of a card user from the card user data base, the position-acquiring unit of the enterprise of the cellular telephone is provided with a means for acquiring information on a position of the cellular telephone on a basis of the telephone number of the cellular telephone, and the authentication unit of the card company is provided with a means for judging whether the card user is a true owner of the card or not on a basis of a comparison between the position of the card reader and that of the cellular telephone of the card user.

Accordingly, since authentication is confirmed by information on the position, the owner of the card can prevent his card from being used by an unauthorized person such as an impersonator, even when he loses his card.

According to the third feature of the invention, a door lock system using information on a position and a perennial identification number, comprises:

a door-locking unit, a position acquiring unit of an enterprise of a cellular telephone, and the cellular telephone, the door-locking unit being composed of:

a first memory domain for storing information on a user, an external communication means, a second memory domain for storing information on a position of the door-locking unit, a means for verifying a personal identification number and the position of the cellular telephone.

a locking means, and a personal identification number-inputting means, wherein the door-locking unit acquires information on the position of the cellular telephone of a user derived from the position-acquiring unit of the enterprise of the cellular telephone when the personal identification number is inputted, compares the acquired information on the position of the cellular telephone with the information on the position of the door-locking unit stored in second memory domain, further compares the personal identification number inputted through the personal identification number-inputting means with that stored in the first memory domain, and judges whether the personal identification number is correct or not, and whether the personal identification number is inputted by the user himself or not in the means for verifying the personal identification number and the position of the cellular telephone.

Accordingly, it is sufficient that the user carries that cellular telephone usually used with him, and security of the authentication system is heightened without being deteriorated in facilities for the user.

The cellular telephone may be provided with a means for rejecting a requirement that the position-acquiring unit is notified of the position of the cellular telephone in accordance with an instruction of the user.

The means for acquiring information on the position of the cellular telephone may be a position-detecting means connected with the cellular telephone.

The means for acquiring information on the position of the cellular telephone may be a means for calculating the position of the cellular telephone on the basis of field intensities of electric waves radiated from one or more base stations.

BRIEF DESCRIPTION OF DRAWINGS

The invention will be explained in more detail in conjunction with appended drawings, wherein.

DESCRIPTION OF PREFERRED EMBODIMENTS

Figure 1:
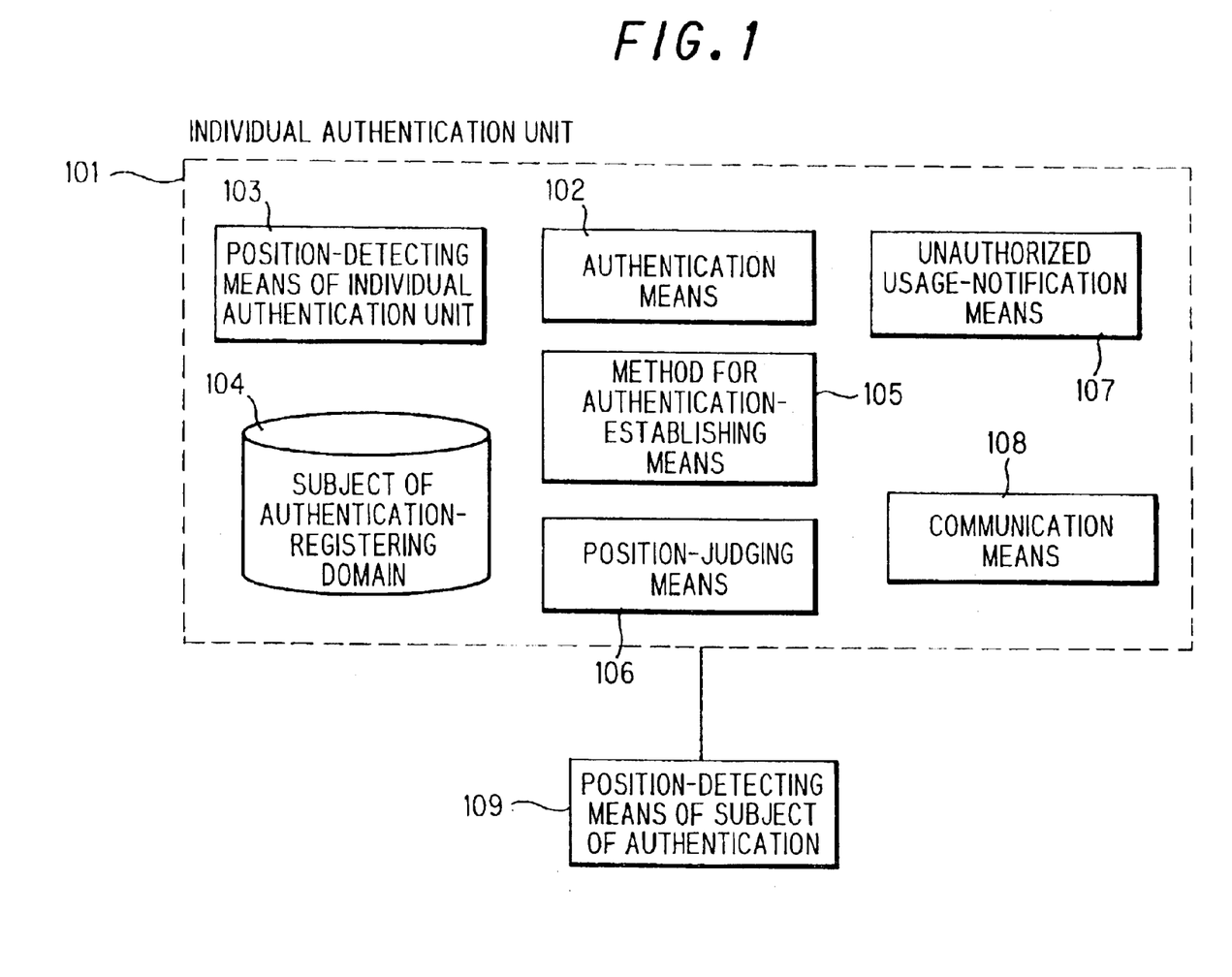
FIG. 1 shows a structure of an individual authentication system according to the first preferred embodiment of the invention.

Hereafter, preferred embodiments of the invention will be explained referring to FIGS. 1 to 4. FIG. 1 shows a structure of an individual authentication system using information on a position according to the first preferred embodiment of the invention.

As shown in FIG. 1, an individual authentication unit 101 is composed of an authentication means 102, a position-detecting means 103 of the individual authentication unit 101, a subject of authentication-registering domain 104, a method for authentication-establishing means 105, a position-judging means 106, au unauthorized usage-notification means 107, and a communication means 108.

In the invention, the position-detecting means 109 of the subject of authentication is used in combination with the individual authentication unit 101, and the position-judging means 106 judges whether the subject of authentication is a legitimate one or not on the basis of a comparison between the position of the individual authentication unit 101 detected by the position detecting means 103 of the individual authentication unit 101 and that of the subject of authentication detected by the position-detecting means 109 of the subject of authentication, where the judgement mentioned in the above is confirmed by the authentication means 102. The individual authentication unit 101 having the aforementioned structure can exclude unauthorized access such as impersonation.

Figure 2:
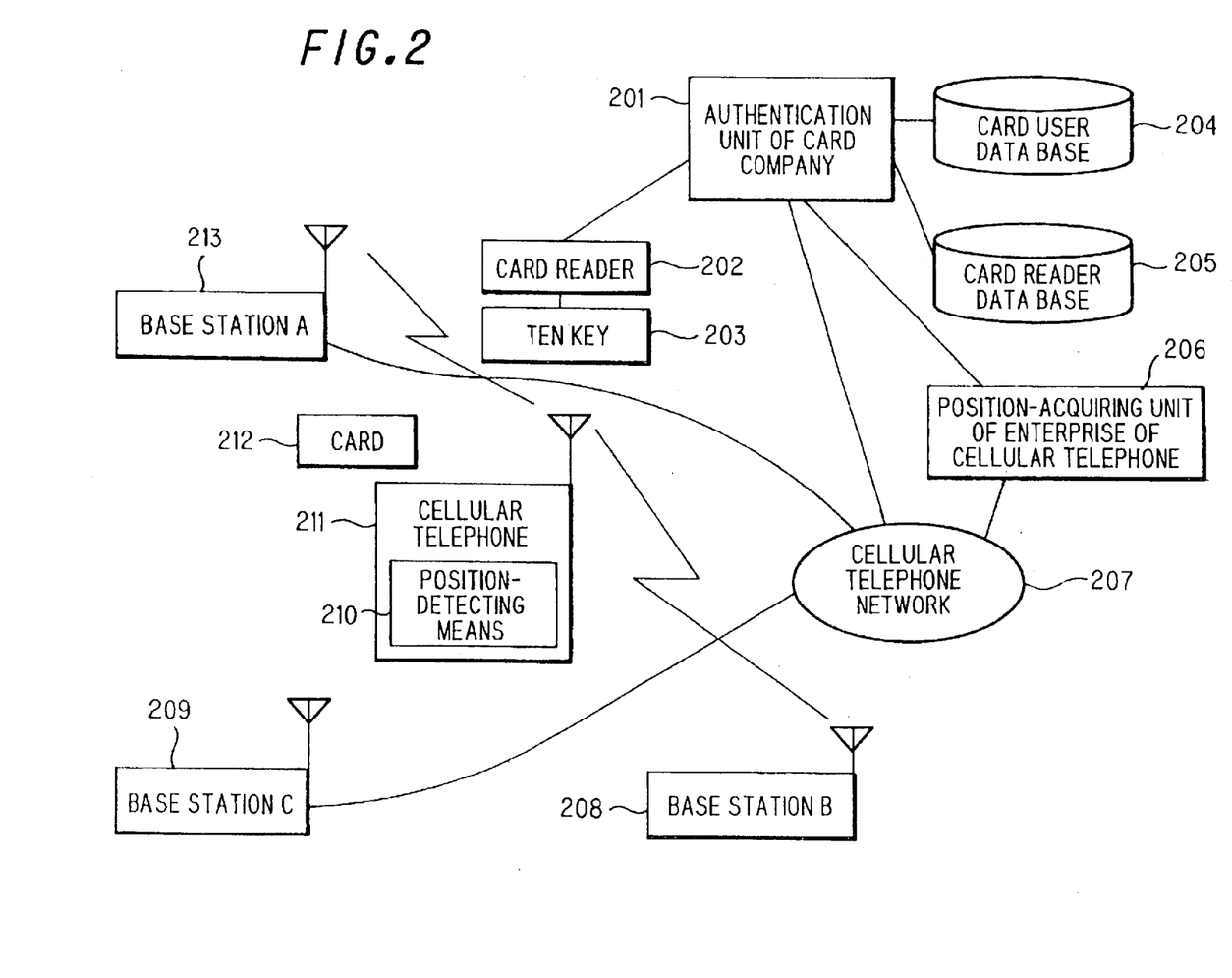
FIG. 2 shows a structure of an authentication system using a card and a cellular telephone according to the second preferred embodiment of the invention.

FIG. 2 shows the second preferred embodiment of the invention, in which authentication is supported by an identification card system and information on a position of a cellular telephone. Information on identification of a user is stored on the card 212, which is either a magnetic card or an IC card. As mentioned in the above, the card reader 202 has its inherent identification information. A ten key 203 is used in case that the user is authenticated on the basis of his personal identification number.

An authentication unit 201 of the card company calculates information on the position of the card reader 202 on the basis of identification information of the card reader 202 and the data read from a card reader data base 205 which stores identification information of the card reader 202 and situations of the same. The authentication unit 201 of the card company can search for the telephone number of the cellular telephone of the card user from the card user data base 204. A position-acquiring unit 206 of an enterprise of the cellular telephone acquires information on the position of the cellular telephone on the basis of the telephone number of the cellular telephone 211. A means 210 for detecting the position of the cellular telephone 211 is connected with the cellular telephone 211. The position detecting means 210 may detect the position of the cellular telephone 211 by calculating field intensities of electric waves radiated from one or more base stations. If the aforementioned method is adopted, the position-detecting means 210 on the cellular telephone 211 becomes unnecessary. An example of the position-detecting means 210 may be the global positioning system (GPS, hereinafter).

Figure 3:
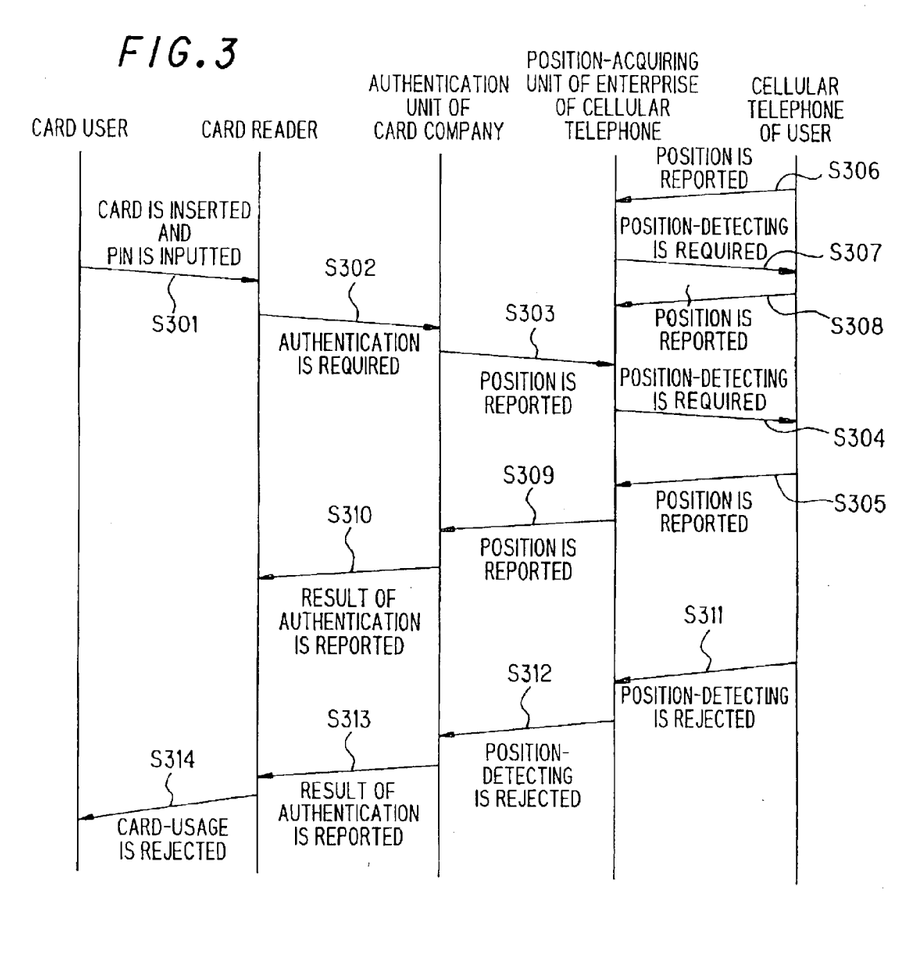
FIG. 3 shows an operation of an authentication system according to the second preferred embodiment of the invention.

The operation of the second preferred embodiment of the invention will be explained referring to FIG. 3.

The user inserts his card into a card reader 202, and inputs his personal identification number. Otherwise, if he uses his card in a manned shop, he hands over the card to a member of the shop, and the member of the shop passes the card through the card reader 202. In this case, the user may signs his name on a chit after he is certified without inputting his personal identification number, and the member of the shop may judge that the user is a true owner of the card by comparing his signature on the chit with that written on a book of the shop. The card reader 202 reads identification information of the user. In most cases, identification information of the user is composed of plural Arabic figures.

The card reader 202 requires the authentication unit 201 of the card company to authenticate the user of the card on the basis of identification information of the user. If the personal identification dubber of the user of the card is inputted in S301, the card reader 202 notifies the authentication unit 201 of the card company of the personal identification number together with identification information of the user.

The authentication unit 201 of the card company authenticates the user on the basis of identification information of the user and the data obtained from the card user data base 204. Explaining the above description concretely, the term of validity of the card can be exemplified. Simultaneously with authentication mentioned in the above or after authentication is performed correctly, the authentication unit 201 of the card company surveys the telephone number of the cellular telephone 211 of the user on the basis of identification information of the user and the data obtained from the card user database 204, informs a position-acquiring unit 206 of an enterprise of the cellular telephone about the telephone number of his cellular telephone 211, and requires the position acquiring unit 206 to notify the authentication unit 201 of the card company of the position of the cellular telephone 211 of the user.

The position-accruing unit 206 of the enterprise of the cellular telephone requires the cellular telephone 211 to detect its position on the basis of the telephone number thereof, which has been reported from the authentication unit 201 of the card company.

The cellular telephone 211 of the user which has received an instruction to detect the position of itself detect it, and notifies the position acquiring unit 206 of the position thereof.

The cellular telephone 211 may detect its position and report it to the position acquiring unit 206 of the enterprise of the cellular telephone previously before the authentication unit 210 of the card company requires information on the position of the cellular telephone 211, which may be used as information on the position of the cellular telephone 211 in the authentication unit 201 of the card company.

The position-acquiring unit 206 of the enterprise of the cellular telephone may require the cellular telephone 211 to detect its position previously before the authentication unit 201 of the card company requires information on the position of the cellular telephone 211.

The position of the cellular telephone 211 previously acquired in S307 may be used as information on the cellular telephone 211 in the position acquiring unit 206 of the enterprise of the cellular telephone.

The authentication unit 201 of the company compares the position of the card reader 202 with that of the cellular telephone 211, and if the difference therebetween is larger than the prescribed value, the authentication unit 201 of the card company judges that the card issued by an unauthorized third person such as an impersonator, and rejects authentication. The card user can determine the aforementioned prescribed value previously in consideration of an error which may occur in detection of the position.

The authentication unit 201 of the card company notifies the card reader 202 of the result of the authentication.

If the card user has a suspicion that access is unauthorized, he can instruct his cellular telephone 211 to reject a requirement that the position-acquiring unit 206 is notified of the position of the cellular telephone 211. According to the aforementioned structure, the user can prevent his card from being used by an unauthorized third person such as an impersonator as shown in S 311 to S 314.

Other Embodiment of Invention

Figure 4:
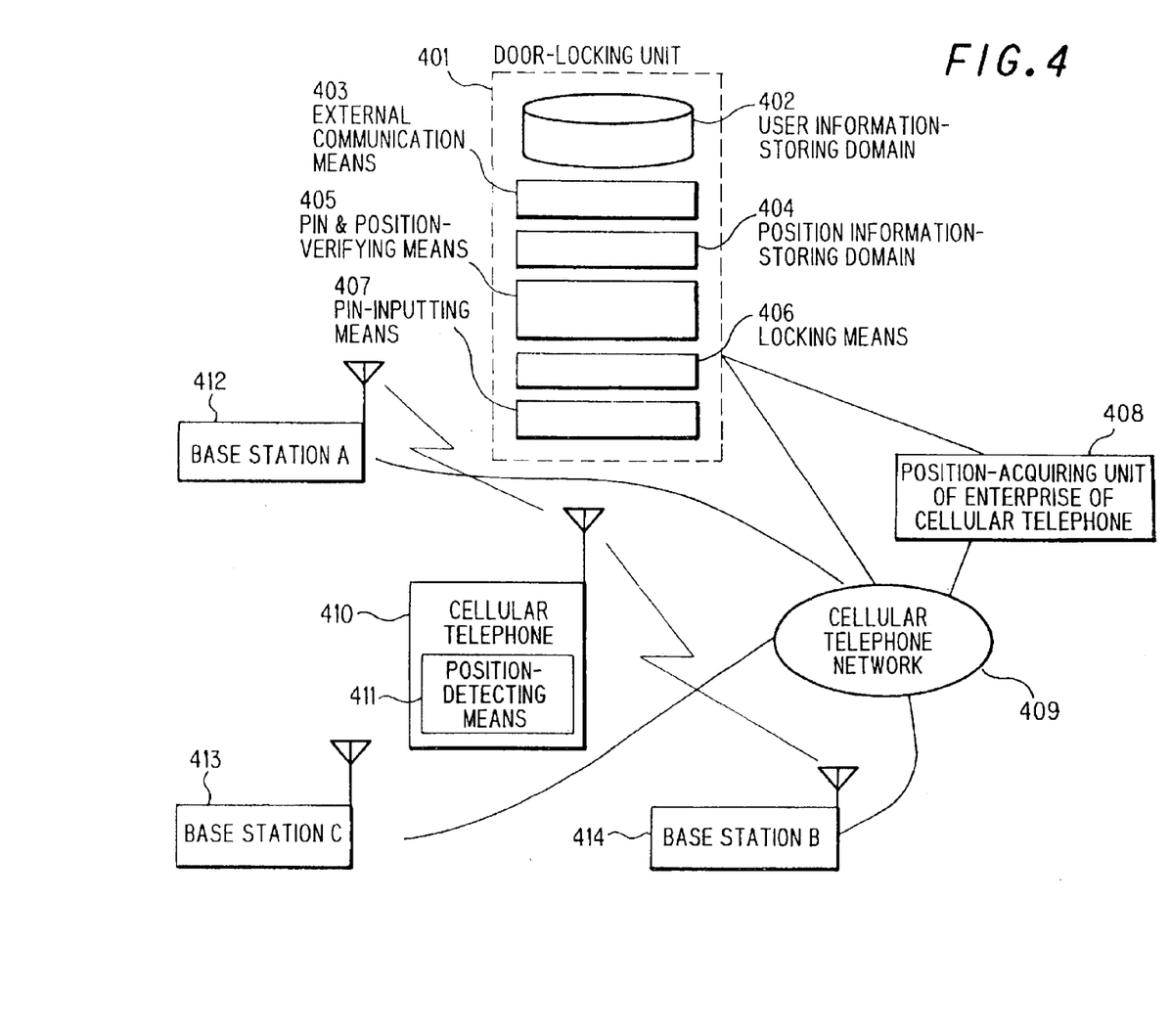
FIG. 4 shows a structure of a door lock system using a personal identification number according to the third preferred embodiment of the invention.

FIG. 4 shows a door lock system using information on a position and a personal identification number according to the third preferred embodiment of the invention, in which a door-locking unit 401 serves as an authentication unit.

The door-locking unit 401 is composed of a memory domain 402 for storing information on a user, an external communication means 403, a memory domain 404 for storing information on a position of the door-locking unit 401, a means 405 for verifying a personal identification number and a position of a cellular telephone, a locking means 406, and a personal identification number-inputting means 407. The door-locking unit 401 acquires information on the position of the cellular telephone 410 of a user which is acquired by a position-acquiring unit 408 when the personal identification number is inputted, compares information on the position of the door-locking unit 401 stored in the memory domain 404 with that of the cellular telephone 410, and further compares the personal identification number stored in the memory domain 402 with that inputted through the personal identification number-inputting means 407. Then the door-locking unit 401 judges whether the personal identification number inputted through the personal identification number-inputting means 407 is correct or not, and whether the personal identification number is inputted by the user himself or not in the means 405 for verifying the personal identification number and the position of the cellular telephone 410. According to the aforementioned structure, the user can prevent his card from being used by an unauthorized third person such as an impersonator, even when the unauthorized third person inputs the correct personal identification number.

The individual authentication unit may be provided with a notification means using a voice signal separately, which immediately notifies the user via his cellular telephone that the card is used at a position remote from him or by a person other than him.

Moreover, the individual authentication unit maybe provided with a notification means using an electronic mail separately, which notifies the user via his cellular telephone that the card is used at a position remote from him or by a person other than him.

The cellular telephone may be provided with a means for rejecting a requirement that the position-acquiring unit is notified of the position of the cellular telephone in accordance with an instruction of the user, hence authentication is rejected. If the user has a suspicion that access is unauthorized, he can instruct the cellular telephone to reject a requirement that the position-acquiring unit is notified of the position of the cellular telephone. According to the aforementioned structure, the user can prevent his card from being used by an unauthorized third person such as an impersonator.

The position of the card reader may be detected by providing a GPS for the card reader. If the GPS is used in the above mentioned way, the card reader can be used even in a taxi.

A personal handy phone system (PUS) or a portable information terminal built-in a radio unit may be used instead of the cellular telephone in the embodiment of the invention.

As mentioned in the above, the effects of the invention can be summarized as follows.

The individual authentication system according to the invention has an outstanding advantage that the owner of the card can prevent his card from being used by an unauthorized third person such as an impersonator, even when hi loses his card. Moreover, if the cellular telephone is used in the authentication system, there is no necessity for buying a new instrument.

When the invention is applied to the credit card system, it is sufficient that the user of the card carries his cellular telephone with him, and passes the credit card throughout the card reader. Accordingly, the credit card system according to the invention affords full facilities for the user, and heightens security of the credit card system.

Moreover, according to the invention, since the card company can heighten security of the card system without being driven by necessity for purchasing new apparatus, the value added of the card system is heightened, and insurance money to be paid because of unauthorized usage of the cards can be expected to be reduced.

If the position of the cellular telephone is detected through a calculation based on field intensities of electric waves radiated from one or more base stations, there is no necessity for purchasing a specified apparatus.

What is claimed is:

1. An individual authentication system using information on a position, comprising:
    a means for detecting a position of a cell phone carried by a subject of authentication, and
    an individual card authentication unit,
    said individual card authentication unit being composed of:
    a means for detecting a position of said individual card authentication unit,
    a mean for authentication of a card issued to said subject of authentication, and
    a means for judging,
    wherein said means for judging determines whether said subject of authentication is a legitimate one or not on a basis of a comparison between said position of said individual card authentication unit detected by said means for detecting said position of said individual card authentication unit and said position of said cell phone carried by said subject of authentication detected by said means for detecting said position of said cell phone carried by said subject of authentication, and
    said judgment is confirmed by said means for authentication of said card;
    wherein said judging means determines that the subject of authentication is legitimate if the position of said cell phone carried by said subject of authentication is the equal to or near that of the position of said individual card authentication unit: and
    wherein a transaction is permitted only if said judging means determines that the subject of authentication is legitimate and if said judgment is positively confirmed by said means for authentication of said card.

2. The individual authentication system as defined in claim 1, wherein:
    said system further comprises an unauthorized usage-notification means for notifying said subject of authentication through a voice signal transmitted to the cell phone carried by said subject of authentication that a card of the subject of authentication is being used or has recently been used at a position remote from the position of said subject of authentication or by a person other than the subject of authentication.

3. The individual authentication system as defined in claim 1, wherein:
    said system further comprises an unauthorized usage-notification means for notifying said subject of authentication through an electronic mail transmitted to the cell phone of said subject of authentication that a card of said subject of authentication being used or has recently been used at a position remote from the position of the subject of authentication by a person other than the subject of authentication.

4. An authentication system using information on a position and a card, comprising:
    a card reader,
    a ten key input device for authenticating a user on a basis of a user's personal identification number,
    card authentication unit of a card company,
    a card reader data base storing identification information of said card reader,
    a card user data base, and
    a position-acquiring unit of an enterprise of a cellular telephone for acquiring a position of a cellular telephone,
    wherein said card authentication unit of said card company is provided with a means for obtaining information on a position of said card reader on a basis of said card reader identification information stored in said card reader data base, and a means for searching for a telephone number of said cellular telephone of a card user from said card user data base,
    said position-acquiring unit of said enterprise of said cellular telephone is provided with a means for acquiring information on a position of said cellular telephone on a basis of said telephone number of said cellular telephone, and
    said card authentication unit of said card company is provided with a means for judging whether said card user is a true owner of said card or not on a basis of a comparison between said position of said card reader and the position of said cellular telephone of said card user
    wherein the card authentication unit judges that the card user is a true owner of the card when the position of the card reader is equal to or near that of the position of the cellular telephone of said card user.

5. The authentication system as defined, in claim 4, wherein:
    said cellular telephone is provided with a means for rejecting a requirement that said position-acquiring unit is notified of said position of said cellular telephone in accordance with an instruction of said user.

6. The authentication system as defined in claim 4, wherein:
    said means for acquiring said information on said position of said cellular telephone is a position-detecting means connected with said cellular telephone.

7. A door lock system using information on a position and a personal identification number, comprising:
a door-locking unit,
a cellular telephone;
a position acquiring unit of an enterprise of said cellular telephone which is operative for obtaining a position of said cellular telephone, and
said door-locking unit comprising:
a first memory domain for storing information on a user,
an external communication means,
a second memory domain for storing information on a position of said door-locking unit,
a means for verifying a personal identification number of said user and said position of said cellular telephone being carried by said user,
a locking means, and
a personal identification number-inputting means,
wherein said door-locking unit acquires information on said position of said cellular telephone being carried by said user derived from said position-acquiring unit of said enterprise of said cellular telephone when said personal identification number is inputted by said user, compares said acquired information on said position of said cellular telephone being carried by said user with said information on said position of said door-locking unit stored in second memory domain, and further compares said personal identification number input by said user through said personal identification number inputting means with that stored in said first memory domain, and judges whether said personal identification number is correct or not, and permits unlocking of a lock of said door locking unit if said personal identification number inputted by said user through said personal identification number inputting means is equal to or near to the position stored in said first memory domain and further only if said acquired information on said position of said cellular telephone being carried by said user is equal to or near that of said information on said position of said door-locking unit stored in second memory.

8. The door lock system as defined in claim 7, wherein:
said cellular telephone is provided with a means for rejecting a requirement that said position-acquiring unit is notified of said position of said cellular telephone in accordance with an instruction of said user.

9. The door lock system as defined in claim 7, wherein:
said means for acquiring said information on said position of said cellular telephone is a position-detecting means connected said cellular telephone.

10. The door lock system as defined in claim 7, wherein:
said means for acquiring said position of said cellular telephone is a means for calculating said position of said cellular telephone on a basis of field intensities of electric waves radiated from one or more base station.

11. An individual authentication system comprising:
a cell phone position detector for determining a position of a cell phone being carried by a subject of authentication, and
an individual authentication unit positioned at a point of sale being used by said subject of authentication or by an unauthorized person,
said individual authentication unit comprising:
an authentication unit position detector for determining a position of said individual authentication unit, and
a communication unit,
an input device,
an authentication device, and
a control device,
wherein said control device determines, in cooperation with said communication unit, said input device and said authentication device, whether said subject of authentication is a legitimate or is an unauthorized person on a basis of
(i) a comparison between said position of said individual authentication unit determined by said authentication unit position detector of said individual authentication unit and said position of said cell phone being carried by said subject of authentication as determined by said cell phone position detector, and
(ii) an authentication result of said authentication device after a user inputs data using said input device of said authentication unit: and
wherein said control device determines that said subject of authentication is legitimate
(iii) if said position of said individual authentication unit determined by said authentication unit position detector of said individual authentication unit is equal to or near that of said position of said cell phone being carried by said subject of authentication as determined by said cell phone position detector and
(iv) said authentication result of said authentication device confirms that said user is a legitimate user.

12. An authentication system using information on a position and a card, comprising:
a card reader,
a key pad for authenticating a user on a basis of a user's personal identification number,
an authentication unit,
a card reader data base storing identification information of said card reader,
a card user data base storing a correspondence between card identifying data and telephone numbers of cellular telephones, and
a position-acquiring unit of an enterprise of a cellular telephone for acquiring a position of a cellular telephone carried by said user,
wherein said authentication unit determines information on a position of said card reader on a basis of said card reader identification information stored in said card reader data base, and
determines a telephone number of said cellular telephone carried by said user from said card user data base,
said position-acquiring unit of said enterprise of said cellular telephone determines information on a position of said cellular telephone being carried by said user on a basis of said telephone number of said cellular telephone, and said authentication unit determines that said user is an authorized user of said card only when said position of said card reader is equal to or near that of the position of said cellular telephone being carried by said user.

13. An authentication system using information on a position and a card, comprising:
a card reader,
an input device for authenticating a user on a basis of a user's input data,
an authentication unit of a card company, a card reader data base storing a correspondence between card identification information and telephone numbers of cellular telephones, a card user data base storing data of said card user, and a position-acquiring unit of an enterprise of a cellular telephone for determining a position of a cellular telephone carried by said user, wherein said authentication unit of said card company determines information on a position of said card reader on a basis of said card reader identification information stored in said card reader data base, and determines a telephone number of said cellular telephone carried by said user from data stored in said card user data base, said position-acquiring unit of said enterprise of said cellular telephone determines information on a position of said cellular telephone being carried by said user on a basis of said telephone number of said cellular telephone, and said authentication unit of said card company determines whether said card user is an authorized user of said card or not on a basis of:

(i) a comparison between said position of said card reader and the position of said cellular telephone being carried by said user, and (ii) a comparison between said user's input data and data stored in said card user data base.

14. An individual authentication method comprising the steps of:

determining a position of a cell phone being carried by a subject of authentication, and determining a position of an individual authentication unit, authenticating said subject of authentication using the individual authentication unit by using data input by the subject of authentication from at least one of a keypad and a card and comparing said data with stored data, determining whether said subject of authentication carrying said cell phone is a legitimate one or not on a basis of:

(i) a comparison between said position of said individual authentication unit and said position of said cell phone being carried by said subject of authentication, and (ii) the result of said authenticating step.

15. A door lock system comprising:

a door-locking unit, a position acquiring unit of an enterprise of a cellular telephone, said door-locking unit comprising:

a first memory for storing information on a user, a second memory for storing information on a position of said door-locking unit, a verification device for verifying a personal identification number and said position of a cellular telephone being carried by a user, a locking device, and a personal identification number-inputting device, wherein said door-locking unit acquires information on said position of said cellular telephone being carried by said user from said position-acquiring unit of said enterprise of said cellular telephone when said personal identification number is inputted by said user using said personal identification number-inputting device, compares said acquired information on said position of said cellular telephone being carried by said user with said information on said position of said door-locking unit stored in second memory, and further compares said personal identification number input by said user through said personal identification number-inputting device with that stored in said first memory, and judges whether said personal identification number is correct or not, and whether the position of the cellular telephone being carried by said user is the same or near the position of said door-locking unit said door locking unit permitting unlocking of a lock of said door locking unit if said personal identification number-input by said user through said personal, identification number-inputting means matches that stored in said cellular telephone being carried by said user is the same or near that of said information on said position of said door-locking unit stored in second memory.

* * * * *